(12) United States Patent
Hirst

(10) Patent No.: US 6,639,701 B1
(45) Date of Patent: Oct. 28, 2003

(54) FIBER OPTIC TRANSMISSION WITH FIBER AMPLIFIERS AND SUPERVISORY SIGNALS

(75) Inventor: Ian Johnson Hirst, Kent (GB)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/202,250

(22) PCT Filed: Jun. 2, 1997

(86) PCT No.: PCT/GB97/01485

§ 371 (c)(1),
(2), (4) Date: Sep. 7, 1999

(87) PCT Pub. No.: WO97/48193

PCT Pub. Date: Dec. 18, 1997

(30) Foreign Application Priority Data

Jun. 11, 1996 (GB) .............................. 9612156

(51) Int. Cl.$^7$ .............................................. H04B 10/02
(52) U.S. Cl. ..................... 359/110; 359/124; 359/134; 359/177
(58) Field of Search ................. 359/110, 124, 359/125, 126, 127, 130, 132, 134, 177

(56) References Cited

U.S. PATENT DOCUMENTS

| 5,383,046 A |   | 1/1995 | Tomofuji et al. |         |
|-------------|---|--------|-----------------|---------|
| 5,436,750 A | * | 7/1995 | Kawano          | 359/177 |
| 5,861,972 A | * | 1/1999 | Tomooka et al.  | 359/177 |
| 6,075,633 A | * | 6/2000 | Deguchi et al.  | 359/133 |

FOREIGN PATENT DOCUMENTS

| EP | 0703678 | 3/1996 |
| FR | 2696302 | 4/1994 |

OTHER PUBLICATIONS

A. Hadjifotiou et al., "Supervisory Options For Fibre Optical Amplifier Systems", BNR Europe Limited, U.K., STC Submarine Systems, (4 pages).

* cited by examiner

Primary Examiner—John A. Tweel, Jr.
(74) Attorney, Agent, or Firm—Ware, Fressola, Van Der Sluys & Adolphson LLP

(57) ABSTRACT

Methods of providing supervising signals to amplifiers of a fiber optic system are described. In the system, traffic signals are carried at one or more traffic signal carrier wavelengths and are amplified by the amplifiers so that they are maintained in strength. Supervisory signals are provided either at two different carrier wavelengths, or at a single carrier wavelength which is, although different from the traffic signal carrier wavelengths, such that the supervisory signal is maintained in strength by the same amplifiers. Supervisory information is provided on the supervisory signal by modulation at a frequency substantially lower than that of a traffic bit rate for detection by detectors located at the amplifiers. A fiber optic system is also described which is adapted to utilize this method.

20 Claims, 8 Drawing Sheets

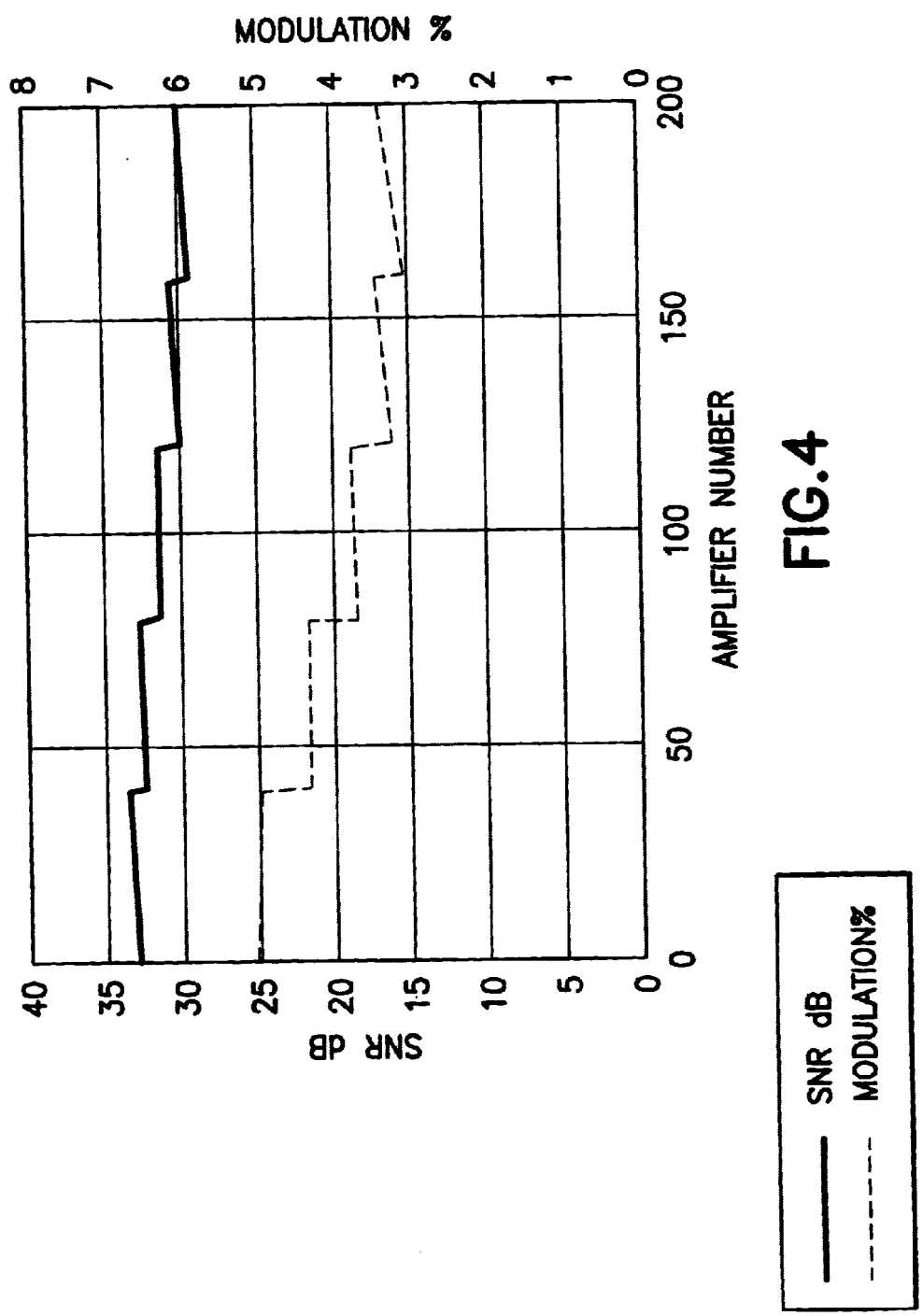

FIBER OPTIC TRANSMISSION WITH FIBER AMPLIFIERS AND SUPERVISORY SIGNALS

FIELD OF THE INVENTION

This invention relates to fiber optic transmission. In particular, the invention relates to a method of providing supervisory signals to optical amplifiers in an optical transmission line. This is of particular relevance to fiber optic transmission systems used for long distance transmission, for example, in undersea cables used for intercontinental signal transmission.

BACKGROUND OF THE INVENTION

An example of a fiber optic transmission system is illustrated schematically in FIG. 1. The system comprises a transmission fiber (5) carrying signals at eight carrier wavelengths (6). The transmission fiber extends from a first main station, or send station, (1) to a second main station, or receive station, (2). Spaced along the transmission fiber (5) are add/drop multiplexers (4). At each add/drop multiplexer (4) the signal at a selected one of the eight carrier wavelengths is dropped to a minor station (3), and replaced with a new signal at the same carrier wavelength from the minor station (3).

To maintain signal strength on a long transmission line, it is necessary to amplify the signal at periodic intervals. It is possible to do this electrically, by conversion of the optical signal on the fiber to an electrical signal followed by amplification of the electrical signal and then conversion back to an optical signal. However, it is generally preferred to use optical amplification methods, which have the advantage that there is no need to convert the transmitted optical signal to an electrical signal until it needs to be processed at a receiving station. In the illustrative example depicted in FIG. 1, there are 200 optical amplifiers between the main stations (1), (2), the add/drop multiplexers being spaced at forty amplifier intervals.

The structure of a typical optical amplifier unit (or repeater) is illustrated in FIG. 2. The input fiber (5a) of the fiber transmission line (5) carries the input signal, which first enters a fiber optic coupler (14a). Here the signal is split into two unequal parts (typically in a ratio of 1:20), the smaller part of the coupler output being branched off to a monitor diode (17a). The main output of the coupler (14a) passes through into an erbium doped fiber amplifier (EDFA) (11). The amplified output from the EDFA (11) passes into a first input (19a) of a multiplexer (16), which is adapted such that substantially the entire signal at the carrier wavelength passes out through a first output (19b).

In this example the carrier wavelength are selected to lie close to 1560 nm. An EDFA provides amplification for light at 1560 nm when it is pumped with light at 1480 nm. The pump light is provided by an appropriate pump laser (12), which may be, for example, an InGaAsP laser. Pumping light is provided through second port (19c) of the multiplexer (16), the multiplexer being adapted such that substantially all the pumping light is transmitted to the EDFA through first input (19a) (serving as an output in this direction).

The multiplexer (16) is adapted such that at the carrier wavelengths, substantially all the light is transmitted directly from first multiplexer input (19a) to the first output (19b) with no transfer across the coupler to the second port (19c), whereas at the pumping wavelength, there is a substantially complete transfer of pumping light across the coupler from second port (19c) to the first input (19a). It is possible through alternative structures to pump the EDFA at the input, or in the middle, rather than at the output side. It is possible to pump, for example, at both input and output sides—this can be advantageous in the case of failure in one pumping connection.

As the EDFA amplifies in both directions, an isolator (15) is required in the output path of the carrier wavelength signal to prevent instability and interference, which could otherwise result from reflections at the output port of the repeater. The isolator (15) has very low attenuation in the forward direction (typically <1 dB) and very high attenuation in the reverse direction (typically >25 dB). The output from the isolator (15) is provided as input to a further coupler (14b), from which the greater part of the signal is transmitted back out onto the transmission fiber (5) at output (5b), a small part of the signal being split off to a further monitor diode (17b).

Monitor diodes (17a), (17b) hence enable monitoring of the input and output power levels of the EDFA. The input power level monitor (17a) monitors the light received from the previous amplifier via the cable. Any fault in the cable or in the previous amplifier will change the input power. As the previous amplifier has had its output power level monitored (by a monitor diode (17b)), the fault can be located to the previous repeater or to the cable in between. Either monitor diode may also be used as a means of receiving supervisory signals for the supervisory section (13): advantageously, the input monitor diode (17a) is used for this purpose, as if the repeater itself is faulty the output monitor diode (17b) may not be able to detect the supervisory signals. Separate photodiodes (not shown) are provided so that the power of the pump laser (12) can be monitored at the supervisory section (13).

It is a necessary feature of such extended fiber optic systems that the repeater units can be subjected to external control: for example, to adjust the gain of the amplifiers in order to optimise a given signal or correct an imbalance. For such adjustment to be possible, it is also necessary for signals indicative of the status of the repeater to be fed back and/or forward to an external control point. This is also desirable in the event of a physical break or other fault in the cable: the position of the break or fault in terms of the repeaters on the cable can be determined by use of such feedback. Normally, such responses signals are sent back to the terminal that initiated the response. This can be achieved, for example, with a FIG. 2 repeater by modulation of the pump laser power by supervisory section (13). This will result in modulation of the output power of the traffic signals output by the EDFA, this modulation being detectable at a receiving station.

An important criterion in design of a system to transmit supervisory information between external control point and repeaters is the simplicity of the resulting repeater structure, and another is the minimization of the effect (e.g. noise) on the traffic signals themselves. High levels of reliability are also important, especially where failure necessitates the repair of an undersea cable. As the nature of the external control point (at a terminal station, where signal generation is straightforward and sophisticated signal processing possible) and of the repeater (where simplicity and reliability are of particular importance) are very different, different solutions are required to satisfy the same criteria. It is therefore preferable to use different approaches to send information from the repeaters to the external control point from those used to send supervisory information or instructions from the external control point to the repeaters.

Provision of information from the repeater to the external control point is generally achieved by a passive loop-back system. An exemplary arrangement is described in Hirst et al, Electronics Letters 29 (3): 255–6, 1993. For the signal travelling in one direction along the trunk of a fiber optic cable system, an optical coupler is provided at the output side of the amplifier, and a small part of the entire signal amplified is split off. The split-off signal is then looped back by means of a further optical coupler on to the fiber carrying signals along the trunk in the other direction. Typically, each coupler will provide about 10 dB of loss for this loop-back path, with the result that approximately 1% of the signal amplified is looped back. The transmitted test signal is thus received back at the external control station on another fiber (and much attenuated) for processing. By averaging and correlation techniques, such looped test signals can be discriminated from noise. By comparison of looped signals from different repeaters with each other, it is possible to deduce which repeater has an especially low or high gain, or to determine in which section of cable there is a cable break.

The present invention is directed to the different problem of provision of supervisory information to the individual repeaters from the point of external control. Various options for solution are discussed in Hadjifotiou, A., Brannan, J., Hirst, I. J., "Supervisory Options for Optical Amplifier Systems", Fourth IEE Conference on Telecommunications Systems in Manchester, England, IEE Conference publication 371, Apr. 18th to 21st 1993, pp 53 to 56. Several of the options there considered were found to have significant disadvantages. One option proposed was to transmit supervisory signals along the electrical power feed to the fiber optic cable: this, however, offers only a low bandwidth for communication and in long systems may lead to a need for high voltage components in order to satisfy power feed requirements. An alternative option is to use a stand alone system with a wholly separate channel to that used for data transmission, for example a 1300 nm channel, used for its operation. Such an arrangement offers a very high capacity, but requires the use of substantial additional hardware. This is because the 1300 nm signal will not be amplified by the amplifiers for the traffic signals and thus will not be regenerated without a separate regeneration network: a 1300 nm laser or LED and a suitable optical receiver are thus required at each repeater.

A preferred option is to employ modulation of the optical carriers used for transmitting data signals. The arrangement shown in FIG. 2 is in fact adapted for this form of supervisory control. The principle of operation is that low frequency, low intensity supervisory information is modulated onto the optical data signal sent out from the terminal providing the external control. This is detected at the repeater by a low frequency receiver: in the FIG. 2 case, the low frequency receiver for extracting supervisory information is a photodiode (17a).

A photodiode is a semiconductor device adapted to produce an output current proportional to the power of the light incident upon it. A silicon diode is an advantageous choice of photodiode for use in this arrangement. In this arrangement, it is advantageous to use diodes which are not sensitive to signals at frequencies as high as that of the bit rate of the traffic transported on the optical fiber. Supervisory information is thus provided by modulation of one or more of the traffic signals at a substantially lower frequency. If a number of traffic signals are transmitted along the optical fiber and one or more, but not all, are modulated, it will not be possible for the photodiode to determine from which traffic signal or signals the modulation information is derived, as it is not possible for it to distinguish between carrier wavelengths. The response of a photodiode in such an arrangement is discussed further below.

While the use of such low level, low frequency, intensity modulation of the carrier signal does provide advantages over other possible methods previously considered for providing supervisory signals to repeaters, it would be desirable to obtain further improvements. Adjustment of the modulation signal to provide sufficiently reliable information to the individual repeaters, but without an unacceptable increase in the error rate for the traffic signals, presents a problem even when such an approach as indicated above is employed.

U.S. Pat. No. 5,383,046A shows how in a conventional optical supervision method the data signal and the supervisory signal are multiplexed and modulated onto a signal optical carrier wavelength. This leads to considerable problems in transmission and detection as previously mentioned.

SUMMARY OF THE INVENTION.

Accordingly, the invention provides a method of providing supervisory signals to amplifiers of a fiber optic system, said fiber optic system carrying traffic signals at one or more traffic signal carrier wavelengths from a first terminal station of the fiber optic system, wherein the traffic signals are amplified by said amplifiers so that the traffic signals are maintained in strength along said fiber optic cable system for detection at a second terminal station;

wherein a supervisory signal is provided at a carrier wavelength different from the one or more carrier wavelengths used for the traffic signals, but wherein the fiber optic system is adapted such that the supervisory signal is amplified such that the supervisory signal is maintained in strength along the fiber optic system by the same said amplifiers amplifying the traffic signals, and wherein supervisory information is provided on the supervisory signal by modulation at a frequency substantially lower than that of a traffic bit rate for detection by detectors located at said amplifiers.

In a further aspect, the invention provides a method of providing supervisory signals to amplifiers of a fiber optic system, said fiber optic system carrying traffic signals at one or more traffic signal carrier wavelengths from a first terminal station of the fiber optic system, wherein the traffic signals are amplified by said amplifiers so that the traffic signals are maintained in strength along said fiber optic cable system for detection at a second terminal station;

wherein supervisory signals are provided at two or more carrier wavelengths different from the one or more carrier wavelengths used for the traffic signals, and wherein supervisory information is provided on the supervisory signal by modulation at a frequency substantially lower than that of a traffic bit rate for detection by detectors located at said amplifiers.

Preferably, the supervisory information is provided by modulation at substantially 200% of the supervisory signal. Advantageously, either the supervisory signal carrier wavelength is variable, or two or more fixed supervisory signal carrier wavelengths are provided. Advantageously, a supervisory signal carrier wavelengths is spaced from the traffic signal carrier wavelengths in such a manner that the supervisory signal can be removed by optical filtering at the second terminal station.

The invention further provides a fiber optic system comprising:

a first terminal station;

a second terminal station connected to the first terminal station by fiber optic cable;

means for providing traffic signals at one or more traffic signal carrier wavelengths at said first terminal station;

means for providing a supervisory signal at supervisory signal carrier wavelengths different from said one or more signal carrier wavelengths at said first terminal; and wherein said fiber optic cable comprises a plurality of amplifiers, the amplifiers of said plurality of amplifiers being adapted to maintain in strength along the fiber optic system both the traffic signals and the supervisory signal, and wherein said amplifiers have associated therewith detectors adapted to detect supervisory information provided by modulation of supervisory signal at a frequency significantly lower than that of a traffic signal bit rate.

Preferably, the detectors are photodiodes, especially silicon diodes. Advantageously, the means for providing supervisory signals comprises a tunable laser source.

Specific embodiments of the invention are described below, by way of example, with reference to the accompanying drawings, in which:

BRIEF DESCRIPTION OF THE DRAWINGS

FIG. 4 shows signal to noise ratio (SNR) and modulation percentage with amplifier for a first comparison method of sending supervisory signals;

DESCRIPTION OF PREFERRED EMBODIMENTS

Figure 1:
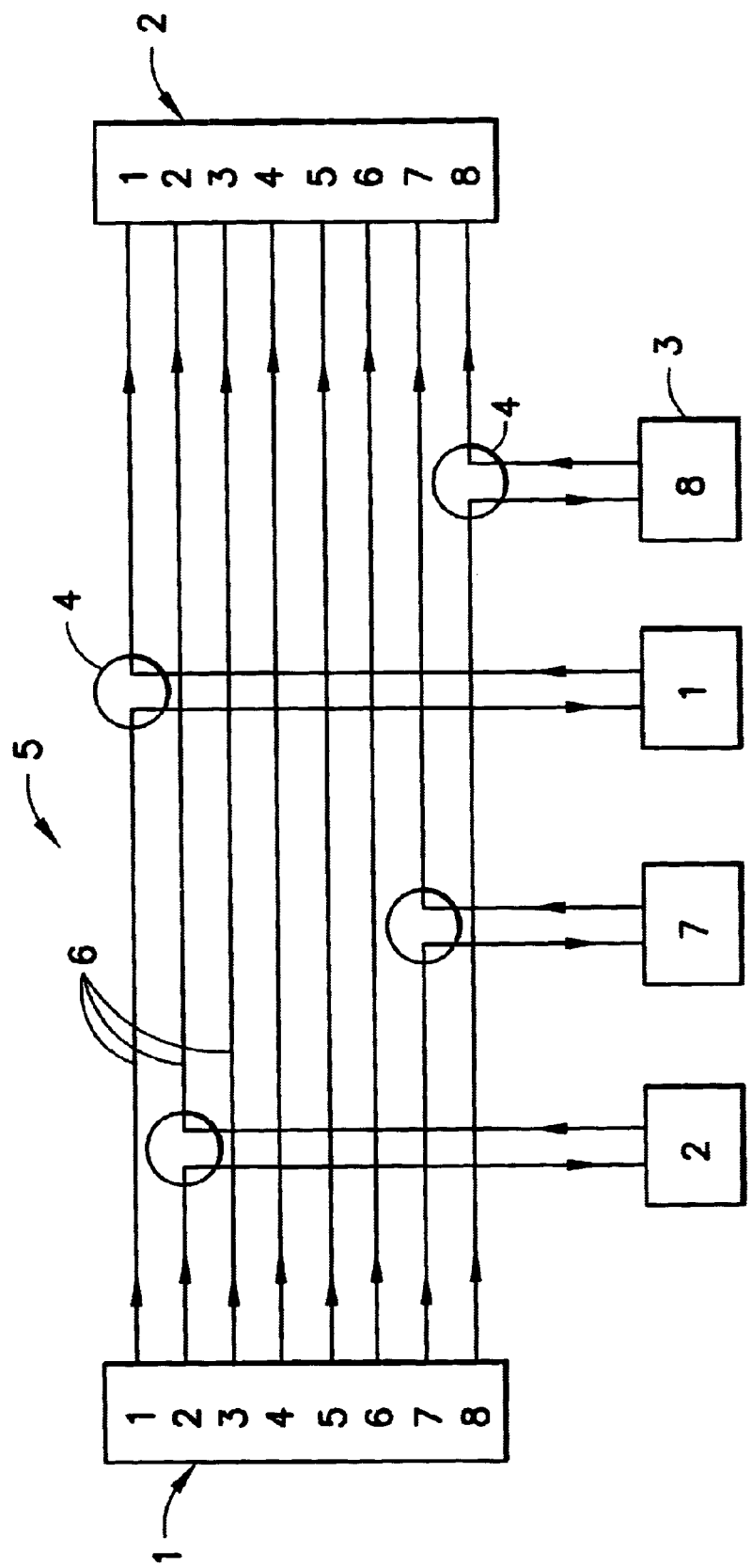
FIG. 1 shows an example of a fiber optic transmission system in which embodiments of the invention may be employed.
Figure 2:
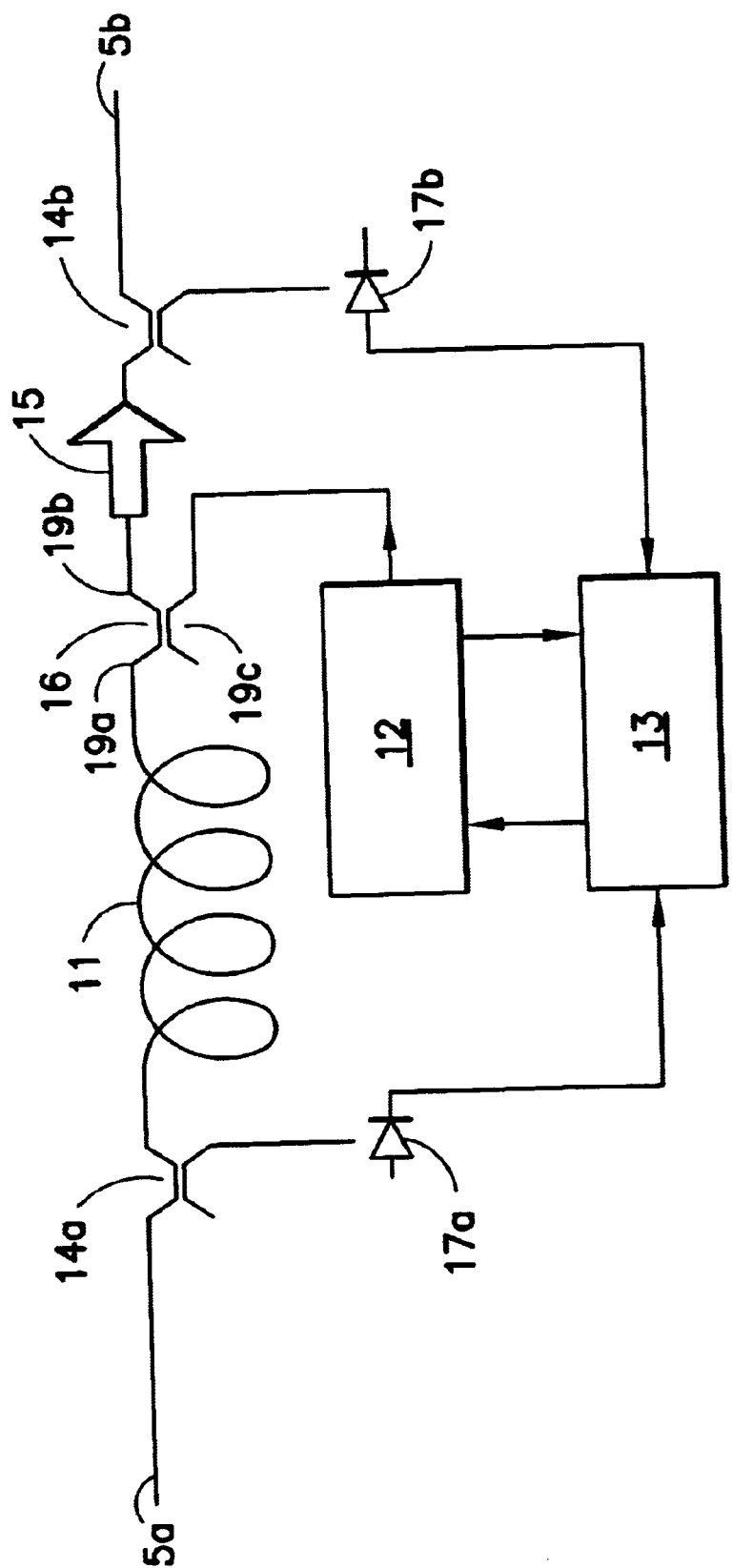
FIG. 2 shows an example of a repeater usable with embodiments of the invention.

FIG. 1 shows an example of a fiber optic transmission system. This transmission system is used here in a comparison of methods of provision of a supervisory signal for amplifiers in a fiber optic system. Supervisory signals are provided at terminal station (1) for each of the 200 amplifiers along the transmission fiber (5) between the two terminal stations, send station (1) and receiving station (2). Eight carrier wavelengths (6) are used, four of which are dropped and replaced by a signal at the same wavelength, each at one of four add/drop multiplexers (4), which are spaced forty amplifiers apart along the transmission fiber (5). Any modulation on a signal which is dropped at an add/drop multiplexer (4) will be lost from the transmission fiber (5).

Figure 3A:
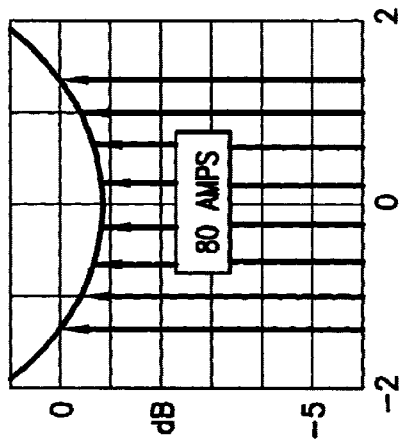
FIG. 3a shows a suitable pre-emphasis for the fiber optic transmission system of FIG. 1, with FIGS. 3b to 3f showing the reshaping of this pre-emphasis along the transmission system.
Figure 3B:
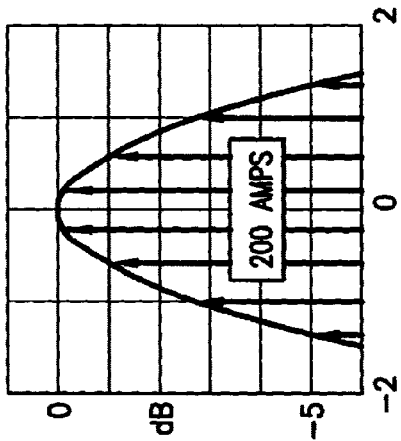
Figure 3C:
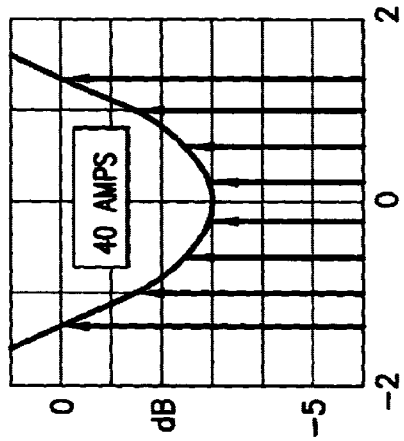
Figure 3D:
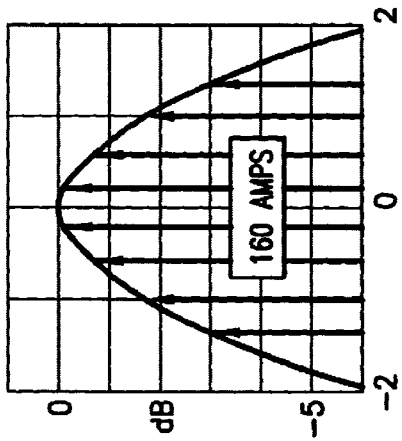
Figure 3E:
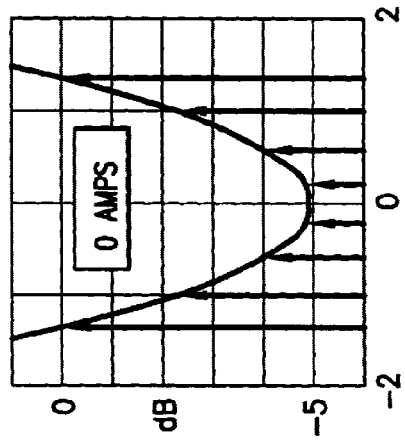
Figure 3F:
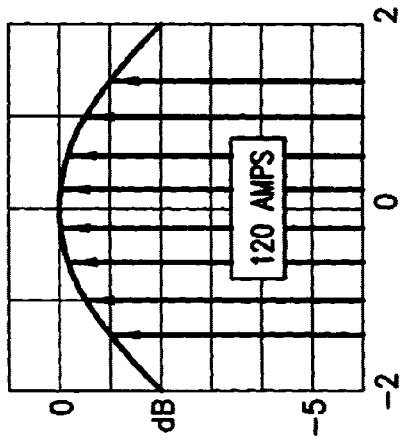

In order to achieve the same signal-to-noise ratio (SNR) for each carrier wavelength at the receive terminal, it is necessary for a degree of pre-emphasis to be introduced. This is because of the filtering action of the amplifiers. The amplifiers in this case each have a line width of 25.5 nm, the 200 amplifiers together forming a concatenated filter. The noise resulting has the shape of the concatenated bandpass filter. In order to maintain a constant optical SNR for each channel at the receive terminal, a pre-emphasis is applied at the send terminal which is to a first order approximation the inverse of that to be found at the receive terminal, and is consequently half of the concatenated filter shape. This is illustrated in FIG. 3, with FIG. 3a showing the position at the send terminal and FIG. 3f showing the position at the receive terminal. It is desirable to achieve equal SNRs in order to maximise the signal carrying capacity of the system.

Four methods of sending supervisory signals from send terminal (1) to the amplifiers on the transmission fiber (5) are compared below. In the accompanying analysis, it is assumed that add/drop multiplexers do not change the signal power at the wavelength added and dropped: this assumption may not be fully justified in practice, as the relative power assigned to a channel at a send station will depend on the ASE noise (amplified spontaneous emission noise—analogous to resistor noise) it accumulates, and hence on the distance it has to travel. Other noise additions will be present in practice (e.g. intermodulation, polarisation) but they have not been considered in this analysis—engineers skilled in this area would be aware of such noise mechanisms and could extend the accompanying analysis accordingly.

The response at the monitor diode used to detect the supervisory signal at each amplifier where there are a plurality of carrier wavelengths incident is given by the analysis that follows.

The diode behaves as a square law device. It obeys the relation $I = R P_s = R e_s^2$, where $P_s$ is the incident optical power, R is the diode responsivity in amps/watt of optical power, $e_s$ is the equivalent electric field and I is the diode current. The electric field for one incident wavelength is $e_s = E_s \cos(\omega_s t + \phi)$, where $E_s$ is the amplitude, $\omega_s$ is the angular frequency, and $\phi$ is the phase.

For several wavelengths incident on the monitor diode then:

$$I = R(e_1 + e_2 + e_3 \ldots e_n)^2$$

$$I = R(_1 + e_2^2 + e_3^2 \ldots e_n^2 + 2e_1e_2 + 2e_1e_3 + 2e_1e_4 \ldots)$$

The $e_n^2$ terms expand as $$\frac{E_n^2}{2} + \frac{E_n^2}{2}\cos(2\omega_n t + 2\phi)$$

Similarly $e_1e_2$ terms expand as:

$$\frac{E_1 E_2}{2}\cos((\omega_1 - \omega_2)t + (\phi_1 - \phi_2)) + \frac{E_1 E_2}{2}\cos((\omega_1 + \omega_2)t + (\phi_1 + \phi_2))$$

At a wavelength of 1560 nm, the frequencies are about $10^{14}$ Hz and terms containing $\omega^2$ and $\omega_1 + \omega_2$ may be discarded.

The current I can now be written as:

$$I = R(E_1^2/2 + E_2^2/2 + E_3^2/2 + \ldots E_n^2/2) +$$
$$R\left(\frac{E_1 E_2}{2}\cos((\omega_1 - \omega_2)t + (\phi_1 - \phi_2)) +\right.$$
$$\left.\frac{E_1 E_3}{2}\cos((\omega_1 - \omega_3)t + (\phi_1 - \phi_3)) + \ldots \right)$$

Now $E_n^2/2 = P_n$, and $$(E_1 E_2)/2 = \sqrt{P_1}P_2$$

so making the appropriate substitutions in the above equation gives $$I = R(P_1 + P_1 + P_1 \ldots) + R(2\sqrt{P_1}P_2 \cos((\omega_1-\omega_2)t+(\phi_1-\phi_2)) + 2\sqrt{P_1}P_3 \cos((\phi_1-\phi_3)t+(\phi_1-\phi_3)) + \ldots)$$

The first set of terms is the current due to the total optical power of the incident wavelengths. The second set of terms is the ac current due to the difference frequencies.

It is now assumed that $\omega_1$ and $\omega_2$ are traffic optical signal frequencies, one or both of which are modulated with supervisory information. For wavelengths at 1560 nm, a wavelength difference of 1 nm is a frequency difference of 123 Ghz. Typical spacings between traffic wavelengths are 98 Ghz(0.8 nm). The slow speed repeater monitor diode will not respond to these frequencies and therefore only first set of terms can give an output. The traffic wavelengths are modulated with NRZ (non return to zero) data and only their low frequency components are detected. The traffic wavelengths carrying random data signals (bit rate 2.5 Gbit/s) produce a noise-like signal at low frequency. This noise sets the SNR of the supervisory signal.

As indicated above, it has been assumed that the signal power is very much greater than the ASE noise. This is true for amplifiers at the start of the system, but there will be an effect towards the end of the line, where the ASE noise power dilutes the modulation. Such dilution can be offset by increasing the level of the supervisory channel or channels relative to the data channels towards the end of the system (e.g. by moving the supervisory wavelength(s) closer to the center wavelength, where there is less attenuation).

Objectives of the comparison between the following four methods of sending supervisory signals are the minimization of the overall modulation of the signal (and hence the proportion of overall signal power diverted to provision of supervisory information), the attachment of a satisfactory level of the supervisory signal at each amplifier, and the minimization of any terminal penalty at the receive terminal (2) caused by the existence of the supervisory signal. These aspects are discussed below with reference to the specific methods indicated.

COMPARISON METHOD 1

All Wavelengths Modulated

The results of this method are illustrated in FIG. 4. In this approach, all eight carrier wavelengths are modulated at 5%. Modulation is defined as the difference between maximum and minimum peak power divided by the mean peak power—the maximum possible degree of modulation is thus 200% modulation: modulation is hence defined in terms of peak-to-peak variation of the mean value of the signal. The modulation index and supervisory SNR for this method (and also for comparison methods 2 and 3 below) are given by the following expressions.

a) Modulation Index $$m_e = m\frac{\sum_{i=1}^{nm} P_{\lambda m_i}}{\sum_{i=1}^{n} P_{\lambda_i} + \int_0^\infty ASE\ Noise(\lambda)d\lambda}$$

where: $P\lambda m_i$ is the power of a modulated wavelength.
nm is the number of modulated wavelengths.
m is the modulation applied to the nm wavelengths.
n is the number of wavelengths.
$P\lambda_i$ is the optical power of the ith wavelength.
$m_e$ is the modulation of the total optical signal.

b) Supervisory SNR

The electrical SNR at a detector is given by the following equation. The ASE noise has been neglected. The modulating waveform is assumed to be a square wave.

$$SNR = 10 LOG_{10}\left(\frac{\frac{16m^2}{\pi^2}\left(\sum_{i=1}^{nm}\frac{P_{\lambda m_i}}{2}\right)^2}{\frac{2Bw}{f_r}\sum_{i=1}^{n}(P_{\lambda_i})^2}\right)\ldots$$

where: Bw is the electrical noise bandwidth.
$f_r$ is the common bit rate for each wavelength.

After each add/drop multiplexer, there is a drop in SNR and modulation, as in each case a modulated signal is "lost" from the transmission fiber (5). Towards the end of the line, the modulation is also reduced due to accumulated ASE noise. FIG. 4 indicates that the minimum modulation is at 160 amplifiers, and is 3%. For modulation to reach a target level of 5% at every amplifier, the modulation at the send terminal 1 has to be increased by 5/3 to 8.3%.

COMPARISON METHOD 2

All Wavelengths Modulated

Three different sets of wavelengths were selected. Set A comprised the four wavelengths dropped to minor stations (3) (Wavelengths 1, 2, 7, 8). Set B comprised the four wavelengths not dropped to minor stations (Wavelengths 3, 4, 5, 6). Set C comprised four shortest wavelengths, two of which were dropped to minor station (3) (Wavelengths 1, 2, 3, 4).

Figure 5:
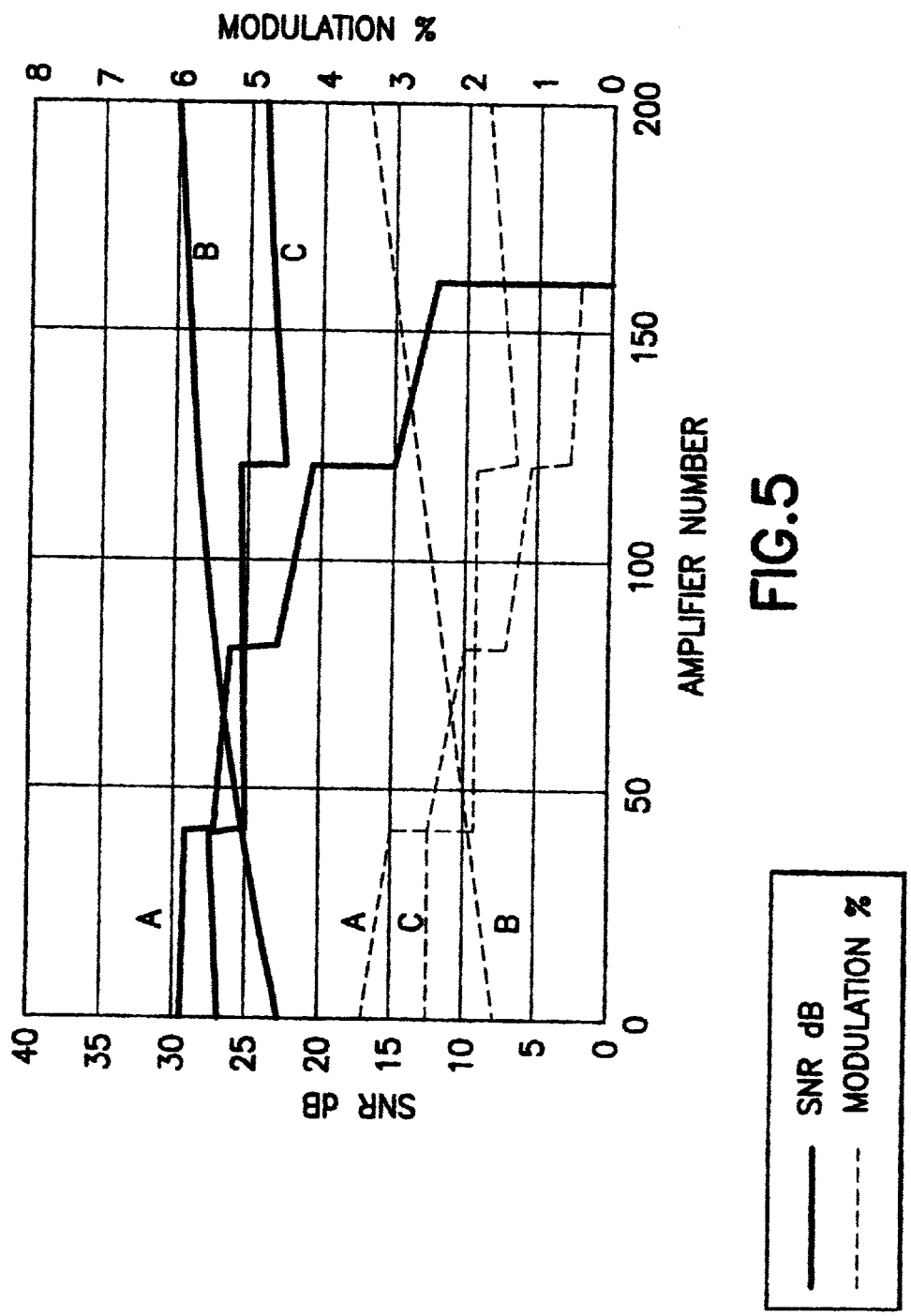
FIG. 5 shows signal to noise ratio (SNR) and modulation percentage with amplifier for a second comparison method of sending supervisory signals.

As can be seen from FIG. 5, Set A produced the best results for the first 80 repeaters, and Set B produced the best results for the final 120 repeaters. The "staircase" effect observed in both modulation and SNR on dropping of a signal at an add/drop multiplexer has a significant effect on the results for Set A and Set C—the signal for Set A is lost altogether after repeater 160, as there is no modulated data signal remaining on the transmission fiber (5) at this point. FIG. 5 shows that the minimum modulation is 2% at 80 amplifiers: to achieve the target at 5% modulation at every amplifier, the modulation at the send terminal (1) needs to be raised to 12.5%.

COMPARISON METHOD 3

One Wavelength Modulated

Figure 6:
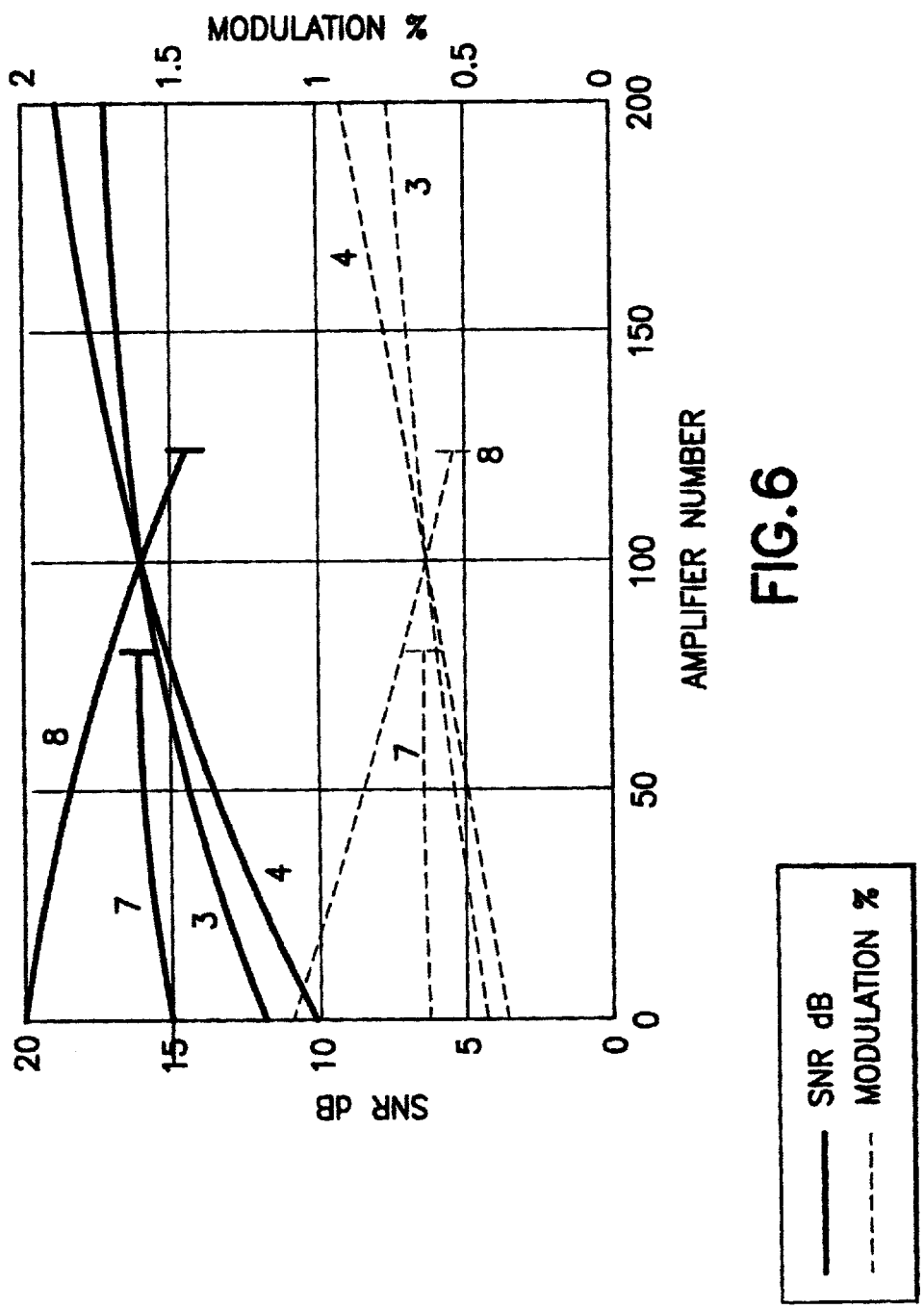
FIG. 6 shows signal to noise ratio (SNR) and modulation percentage with amplifier for a third comparison method of sending supervisory signals.

FIG. 6 illustrates use of a single carrier wavelength to provide the supervisory signal to the amplifier (or to a predetermined subset of the amplifiers). Four of the wavelengths are considered, Wavelengths 3, 4, 7 and 8. However, the disposition of wavelengths with regard to the transmission fiber response (see FIG. 3) is such that each of the wavelengths shown has a pair with essentially the same response (e.g. Wavelengths 1 and 8).

It can be seen from FIG. 6 that Wavelength 8 provides the best response for the first 100 amplifiers and Wavelength 4 provides the best response for the last 100 amplifiers. The minimum modulation occurs at 100 amplifiers, and is 0.6% whatever wavelength is used.

To obtain the target modulation of 5% at every amplifier, it is therefore necessary to provide 41.6% or greater modulation to Wavelengths 4 and 8. In practice, Wavelengths 1, 2, 7 and 8 would probably be adjusted down in level, as these wavelengths do not traverse the whole transmission fiber (5). If this were to happen where a wavelength is employed as the modulation carrier, modulation would have to be increased further to compensate for any reduction in level.

METHOD 1

Separate Wavelength

In this method a single, separate carrier wavelength, not used to carry a traffic signal, is employed for transmission of supervisory information. This carrier wavelength is preferably chosen to fall within the envelope of wavelengths formed by the carrier Wavelengths 1 to 8, but is a wavelength sufficiently different from any of these such that the SNR of the traffic data will not be significantly reduced (see below). This supervisory wavelength is chosen so that the supervisory signal will be amplified satisfactorily by the repeater amplifiers, but also so that the data can be extracted from the total transmitted at the receive terminal (2) (and the minor stations (3)) without penalty.

For this method, modulation index and supervisory SNR are given by the following expressions:
a) Modulation Index The modulation index can be calculated at a point in the line from the following equation.

$$m_e = \frac{2P_{\lambda s}}{\sum_{i=1}^{n} P_{\lambda_i} + P_{\lambda s} + \int_0^\infty ASE\ Noise(\lambda)\,d\lambda}$$

where: n is the number of traffic wavelengths $P_{\lambda s}$ is the power of the supervisory wavelength.
b) Supervisory SNR The electrical SNR at a detector is given by the following equation. Again, the ASE noise has been neglected and the modulating waveform is assumed to be a square wave.

$$SNR = 10 LOG_{10} \left( \frac{\frac{16}{\pi^2} P_{\lambda s}^2}{\frac{2Bw}{f_r} \sum_{i=1}^{n} (P_{\lambda_i})^2} \right)$$

Figure 7:
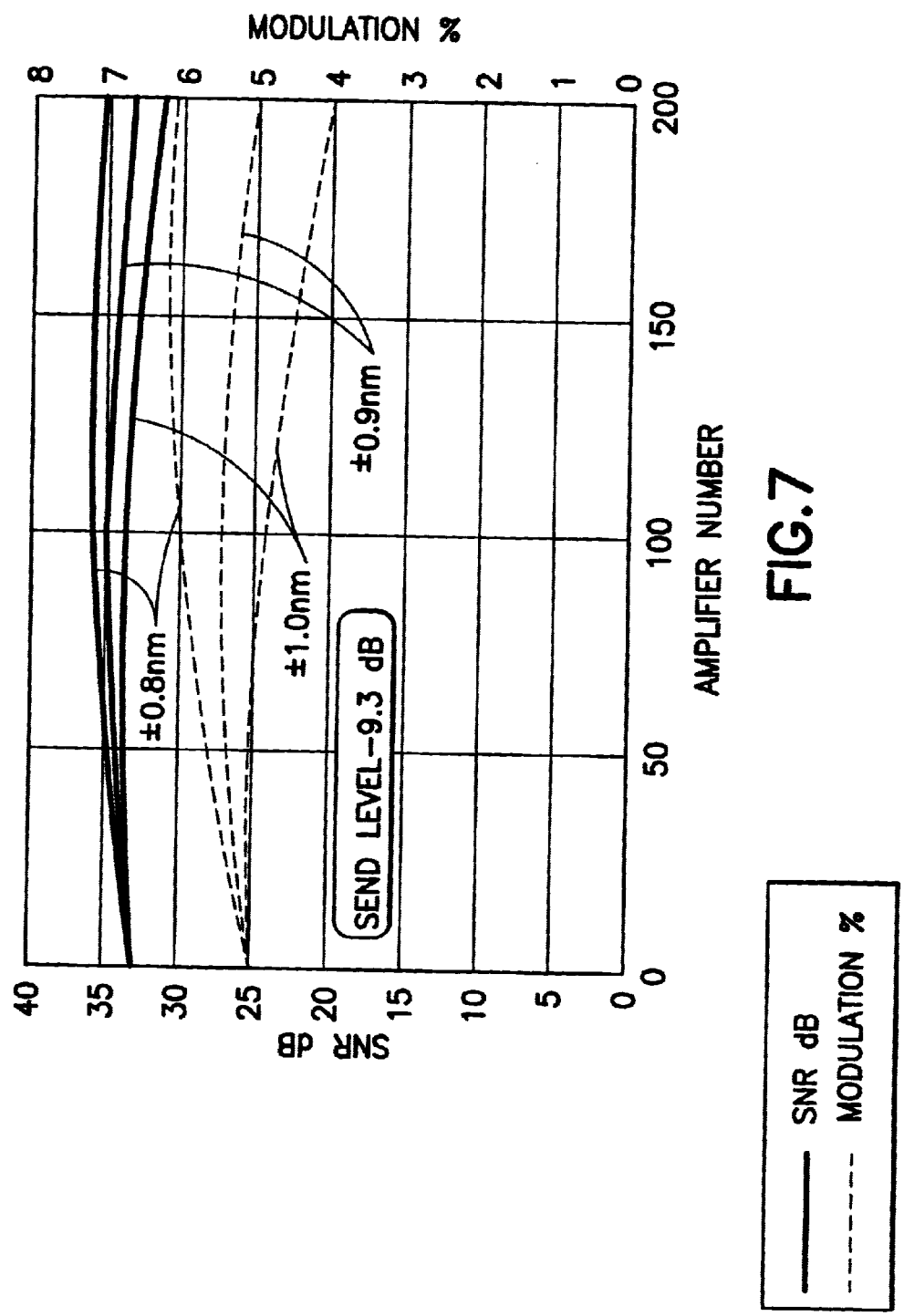
FIG. 7 shows signal to noise ratio (SNR) and modulation percentage with amplifier for a method of sending supervisory signals according to an embodiment of the invention.

As there is no true data signal to be provided on this dedicated supervisory wavelength, "data" can be provided in the form of a random (or otherwise) sequence of bits modulated to the greatest degree possible: that is, 200%. FIG. 7 illustrates three possible choices for supervisory wavelength: ±0.8 nm, ±0.9 nm and ±1.0 nm from the band center (for comparison with the traffic wavelengths, see FIG. 3). The best choice of curve is ±0.9 nm as this exhibits the least spread: in this example, the use of this one wavelength provides (to a good approximation) 5% modulation. 5% modulation corresponds to a supervisory channel power of 2.5% of the total amplifier signal power (neglecting ASE noise). A still greater level of uniformity can be achieved with this approach if two wavelengths are used. In the FIG. 7 example, particularly good results are provided by use of a wavelength of ±0.96 nm with a −9.3 dB transmit level at the send terminal (1) for the first 100 amplifiers, and use of a wavelength of ±0.82 mn at a reduced level of −10.6 dB for the last 100 amplifiers. However, if perfect flatness of modulation or SNR is required, then a unique transmit level and wavelength must be used for each repeater.

A comparison of these methods is provided in Table 1 below:

|  | Comparison Method 1 | Comparison Method 2 | Comparison Method 3 | Method 1 |
|---|---|---|---|---|
| Description | All Wavelengths Modulated | Four Wavelengths Modulated | One Wavelength Modulated | Dedicated Wavelength |
| Terminal Modulation percentage for 5% at each amplifier | 8.3% | 12.5% | 41.6% | 5% |
| Minimum SNR at an amplifier | 33.4 dB | 34 dB | 34.4 dB | 32 dB |
| Terminal penalty (eye closure) | Moderate on all channels | Large on modulated channels | Very large on modulated channels | None directly |

It can thus be seen that Method 1, in accordance with the present invention, is particularly advantageous. A particularly significant issue is that of the terminal penalty. Digital signals received at a terminal can be represented by superposition of consecutive unit waveforms as an "eye pattern", the "opening" of the eye defining a boundary in which no signal can exist under any condition of code pattern in the transmitted signal. Any decision level for determining a logical 1 or 0 in the signal should thus lie within the eye opening. Noise in a given signal channel acts to close the eye opening of the relevant eye pattern, and thus serves to reduce the possibility of receipt of a signal on that channel without error.

In the case of data signals which are modulated, the terminal penalty increases in severity with the degree of modulation. At a terminal, optical filtering separates the optical traffic signals into individual wavelengths. A high speed diode recovers the NRZ from the optical signal and a low pass band delimiting filter with a cut at approximately half the bit rate is used to shape the spectrum. For data at a typical bit rate of 2.5 Gbi/s, the difference id frequency terms between the frequencies employed will be rejected by the band limiting filter, but the power variations of the supervisory wavelength caused by on/off modulation are detected. As the data signal is itself modulated, it is not possible to entirely remove the effects of the modulation. As the modulation frequency is much lower than the bit rate, use of appropriate filters and decisions circuitry can reduce the effects of modulation, but even these methods cannot altogether eliminate the effect.

This problem does not apply to Method 1. As there is no modulation on the data channels, it is only necessary to optically filter out the supervisory signal carrier wavelength at the terminal. For equally spaced traffic channels, no four wave mixing products between the supervisory and traffic channels can appear at traffic wavelengths and inside the electrical bandwidth of the traffic receiver provided that the supervisory and traffic channels are spaced apart by at least twice the bit rate. A typical spacing between a traffic and supervisory wavelength should be chosen to be greater than 0.1 nm (12 Ghz), which comfortably satisfies this criterion. It should also be noted that this difference frequency is too high for the monitor diode at the amplifiers to respond to it. The supervisory channel signalling rate is very low compared with the traffic signalling rate and will not be affected by dispersion. However, one potential negative factor to be addressed in design is a line penalty caused by cross modulation of the supervisory channels and traffic channels caused by phase modulation arising from fiber non-linearity.

To optimise the response at a chosen repeater, or for a chosen group of repeaters, it is most desirable for the supervisory carrier wavelength to be "agile": that is to say, that the carrier wavelength can be changed and, in effect, tuned to a particular set of repeaters. For example, particularly good results can be achieved in the FIG. 7 example by having a source tunable between ±0.96 nm from the band center (to serve the first hundred amplifiers) and ±0.82 nm from the band center (to serve the second hundred amplifiers)—the supervisory carrier wavelength could be provided, for example, by a tunable laser source adapted to cycle between two such values. Tuning of laser sources can be achieved by variation of drive current (to achieve small changes), by variation of an external cavity length, by temperature (to effect relatively large 2–3 nm changes) or by use of additional electrodes. One example of a tunable laser source is the Hewlett-Packard HP 1868A. A still higher degree of uniformity in response could be achieved by use of more than two choices of supervisory carrier wavelength to achieve a finer division of the repeaters into supervisory groups. An effective practical alternative to the use of a wavelength agile supervisory carrier is to employ two (or more) fixed supervisory carrier wavelengths, each with a fixed send level, for transmitting supervisory signals—the equipment to enable this approach will generally be lower in cost. Again, in the FIG. 7 case an effective choice for supervisory carrier wavelengths would be at ±0.96 nm and ±0.82 nm from the band center. An advantage of using fixed supervisory carrier wavelengths is that the wavelengths used can be chosen to lie close to half way between traffic carrier wavelengths, thus rendering them particularly easy to remove at a receive terminal by optical filtering. Positioning a supervisory wavelength exactly half way between adjacent traffic wavelengths of an evenly-spaced set of traffic wavelengths may be disadvantageous, as the supervisory signal may be affected by product signals (e.g., if A and B are the adjacent traffic wavelengths, and C is the supervisory wavelength, then the product A+B−C has the same wavelength as the supervisory C—however other products will lie intermediate between other traffic wavelengths). A slight offset from the halfway point avoids contamination of either the supervisory signal or the traffic signals with such products.

A modification that may be advantageous where there are amplifiers to be monitored in a branch after an add/drop multiplexer is to tune the supervisory carrier wavelengths very close (inside the optical filter bandwidth) to the branched traffic carrier wavelength: this would make supervision of these amplifiers possible with only a very small penalty to other traffic channels.

Figure 8:
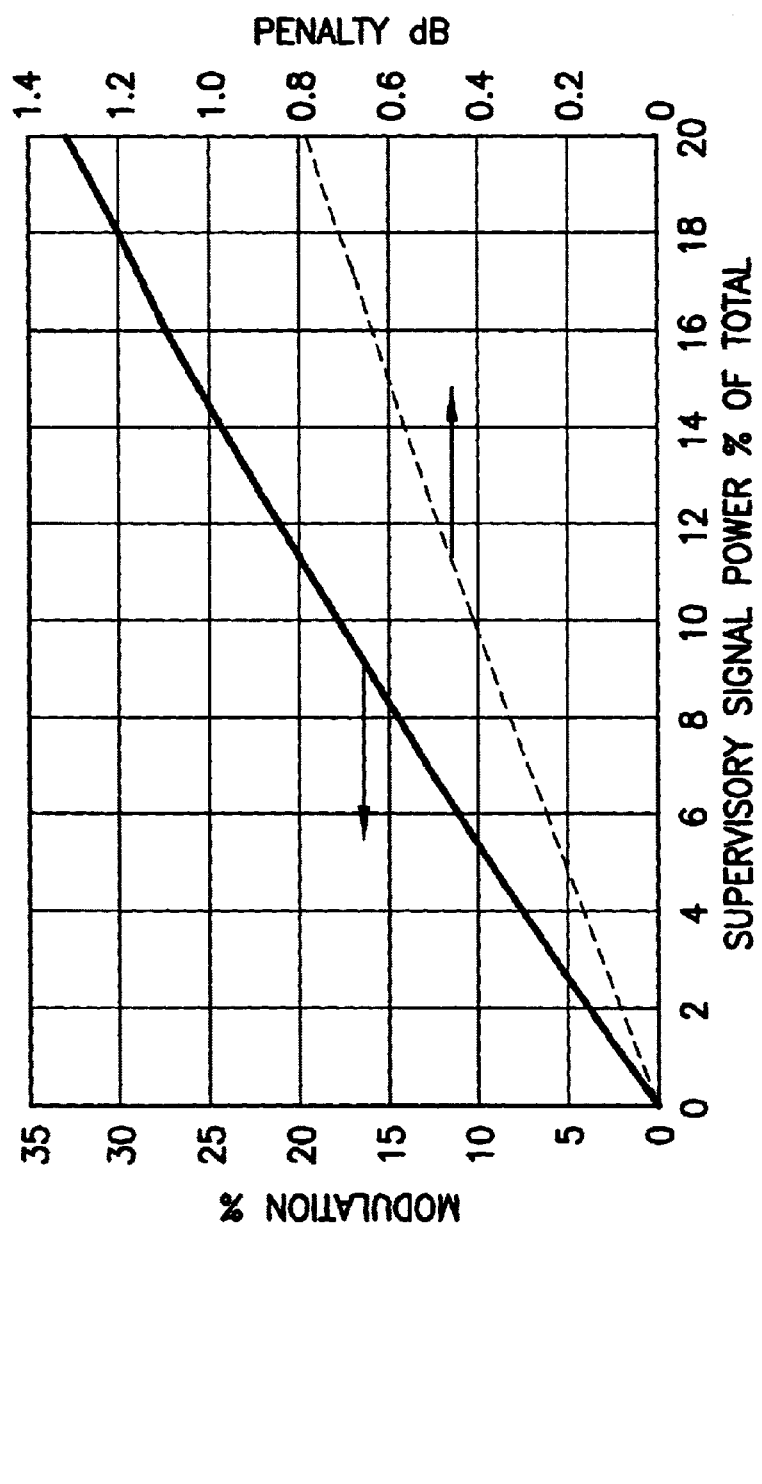
FIG. 8 shows the relationship between modulation and ASE noise penalty for the embodiment of FIG. 7.

A drawback of the use of dedicated wavelengths for supervisory activity is that a portion of amplifier output power is required by the additional signal or signals. This means that there is a reduction in level of the traffic signals, with a consequent increase in the ASE noise. For 5% modulation the noise is found to be of the order of 0.1 dB, which is very much less than the modulated channel penalty at a receiver. The relationship of the degree of modulation to the ASE noise penalty is shown in FIG. 8.

5% modulation provides in practice sufficient SNR for error free communication from the send terminal to the repeater amplifiers (SNR being here calculated with a noise bandwidth of 4 kHz). However, it is possible to increase the degree of modulation beyond this if desired. This may be desirable especially in the case of out of service supervisory operation (for example, where the system has a fault and is not being used for traffic, and the supervisory system is being used to determine the location of the fault).

The supervisory system can be used both for regular routine checks and also for fault detection and location. Routine checks may include a weekly monitoring of each repeater in the system for its parameters (input and output levels, pump powers and currents). Occasionally an adjustable parameter (such as pump power) may be altered to compensate for ageing. For each repeater, supervisory signals are sent out by one terminal station (or more than one terminal station, according to convenience and the configuration of the network) at a supervisory wavelength selected for a given repeater, detected by the relevant photodiode in the repeater and interpreted and acted upon by the supervisory section of the repeater. Where output from the supervisory section to the terminal station is required (for example, in returning parameter values), this may be by modulation of the pump laser power as previously described with reference to the prior art.

Such a routine scan would, generally, be such as to address each repeater in turn starting from one end of the network. This is advantageous as it will lead to the minimum number of supervisory wavelength changes (either in tuning the agile source, or in selecting between given ones of fixed supervisory wavelengths) in systems where there are groups of repeaters such that each repeater in a given group is assigned the same supervisory wavelength, as the scan would then also cover the supervisory groups in sequence. The number of repeaters in a group is determined to provide the best balance between optimisation for each individual repeater (for which, ideally, a different supervisory wavelength would be employed for each repeater) and convenience of use and simplicity of design (which would reduce the number of supervisory wavelengths). As indicated previously, where two or more wavelengths are required (especially for the main fiber trunk of the system), then it may be advantageous to employ fixed wavelengths rather than an a agile wavelength from a tunable source.

Similarly, fault location could be achieved by interrogating a repeater in the center of the system (or in the center of the region where the fault is already known to be) and observing whether a signal is returned from the supervisory section of that repeater. This process can be adopted iteratively until the faulty repeater is located. The same procedure can be followed in the case of an intermittent fault—monitoring is carried out sufficiently long for each repeater to determine whether the fault is present or absent in the part of the system sampled. As before, there is for each repeater a wavelength selected for providing supervisory signals.

Accordingly, provision of supervisory information for repeaters in a fiber optic transmission system can be achieved simply and effectively in a manner particularly suitable for use in undersea cable networks.

What is claimed is:

1. A method of providing supervisory signals to amplifiers of a fiber optic system, the fiber optic system carrying traffic signals at one or more traffic signal carrier wavelengths from a first terminal station of the fiber optic system, wherein the traffic signals are amplified by the amplifiers so that the traffic signals are maintained in strength along the fiber optic cable system for detection at a second terminal station, characterized in that a carrier wavelength different from the one or more carrier wavelengths used for the traffic signals is employed to carry a supervisory signal but no traffic signals, wherein the fiber optic system is adapted such that the supervisory signal is amplified such that the supervisory signal is maintained in strength along the fiber optic system by the same the amplifiers amplifying the traffic signals, and wherein supervisory information is provided on its carrier wavelength by modulation at a frequency substantially lower than that of a traffic bit rate for detection by detectors located at the amplifiers.

2. A method according to claim 1, wherein two or more supervisory signal carrier wavelengths are provided each employed to carry a respective supervisory signal but no traffic signals; and wherein the supervisory information is provided by modulation of each of the two or more carrier wavelengths with the respective supervisory signal.

3. A method as claimed in claim 1, wherein each carrier wavelength for a respective supervisory signal is a fixed wavelength.

4. A method as claimed in claim 1, wherein each carrier wavelength for a respective supervisory signal is variable in wavelength to allow the response at a given amplifier or group of amplifiers to be optimized.

5. A method as claimed in claim 1, wherein the supervisory information is provided by modulation at substantially 200% of the supervisory signal.

6. A method as claimed in claim 1, wherein the supervisory signal carrier wavelength or wavelengths are adapted to be removable from the traffic signal carrier wavelengths by optical filtering.

7. A method as claimed in claim 5, wherein the supervisory signal carrier wavelength or wavelengths lie substantially intermediate between adjacent traffic signal carrier wavelengths.

8. A method as claimed in claim 1, wherein the supervisory signal carrier wavelength or wavelengths are positioned relative to traffic signal carrier wavelengths or as substantially to eliminate interference to the supervisory signal or traffic signals from products of the supervisory and traffic signals.

9. A fiber optic system comprising:

a first terminal station (1);

a second terminal station (2) connected to the first terminal station by fiber optic cable (5);

means for providing traffic signals (1, 2, 7, 8) at one or more traffic signal carrier wavelengths at the first terminal station (1);

means for providing at the first terminal (1) a supervisory signal (3, 4, 5, 6) at a non traffic carrying carrier wavelengths different from the one or more traffic signal carrier wavelengths and for modulating that carrier with the supervisory signal; and the fiber optic cable (5) comprises a plurality of amplifiers (11), the amplifiers of the plurality of amplifiers being adapted to maintain in strength along the fiber optic system both the traffic signals (1, 2, 7, 8) and the supervisory signal, and wherein the amplifiers (11) have associated therewith detectors (17a, 17b) adapted to detect supervisory information provided by modulation of the supervisory signal at a frequency significantly lower than that of a traffic signal bit rate.

10. A fiber optic system as claimed in claim 9, wherein the means for providing the supervisory carrier signal comprises a tunable laser source.

11. A fiber optic system as claimed in claim 9, wherein the means for providing a supervisory carrier signal is adapted to provide two or more supervisory signal carrier wavelengths.

12. A fiber optic system as claimed in claim 9, further comprising one or more add/drop multiplexers (4) between the first terminal station (1) and the second terminal station (2) to drop traffic signals to and/or receive traffic signals from branch stations (3) of the fiber optic system.

13. A method as claimed in claim 2, wherein each carrier wavelength for a respective supervisory signal is a fixed wavelength.

14. A method as claimed in claim 2, wherein each carrier wavelength for a respective supervisory signal is variable in wavelength to allow the response at a given amplifier or group of amplifiers to be optimized.

15. A method as claimed in claim 2, wherein the supervisory information is provided by modulation at substantially 200% of the supervisory signal.

16. A method as claimed in claim 2, wherein the supervisory signal carrier wavelength or wavelengths are adapted to be removable from the traffic signal carrier wavelengths by optical filtering.

17. A method as claimed in claim 6, wherein the supervisory signal carrier wavelength or wavelengths lie substantially intermediate between adjacent traffic signal carrier wavelengths.

18. A method as claimed in claim 2, wherein the supervisory signal carrier wavelength or wavelengths are positioned relative to traffic signal carrier wavelengths or as substantially to eliminate interference to the supervisory signal or traffic signals from products of the supervisory and traffic signals.

19. A fiber optic system as claimed in claim 10, further comprising one or more add/drop multiplexers (4) between the first terminal station (1) and the second terminal station (2) to drop traffic signals to and/or receive traffic signals from branch stations (3) of the fiber optic system.

20. A fiber optic system as claimed in claim 11, further comprising one or more add/drop multiplexers (4) between the first terminal station (1) and the second terminal station (2) to drop traffic signals to and/or receive traffic signals from branch stations (3) of the fiber optic system.

* * * * *